C. F. KETTERING.
SYSTEM OF ELECTRICAL CONTROL.
APPLICATION FILED MAR. 3, 1917.

1,351,910.   Patented Sept. 7, 1920.

Witnesses
Walter W. Riedel
Joseph W. McDonald

Inventor
Charles F. Kettering
By Kerr, Page, Cooper and Hayward
Attorneys.

UNITED STATES PATENT OFFICE.

CHARLES F. KETTERING, OF DAYTON, OHIO, ASSIGNOR, BY MESNE ASSIGNMENTS, TO DELCO-LIGHT COMPANY, OF DAYTON, OHIO, A CORPORATION OF DELAWARE.

SYSTEM OF ELECTRICAL CONTROL.

1,351,910.    Specification of Letters Patent.    Patented Sept. 7, 1920.

Application filed March 3, 1917. Serial No. 152,348.

*To all whom it may concern:*

Be it known that I, CHARLES F. KETTERING, a citizen of the United States of America, residing at Dayton, county of Montgomery, and State of Ohio, have invented certain new and useful Improvements in Systems of Electrical Control, of which the following is a full, clear, and exact description.

This invention relates to improvements in electrical measuring devices and more particularly to that type used in connection with a battery charging system.

One of the objects of the present invention is to position certain of the operating elements of the measuring device, in such a manner that the attendant may readily replace any of these elements if necessary, without dismantling the entire device.

Further objects and advantages will be apparent from the following description, reference being had to the accompanying drawings wherein one preferred form of one embodiment of the present invention is clearly set forth.

Figure 1:
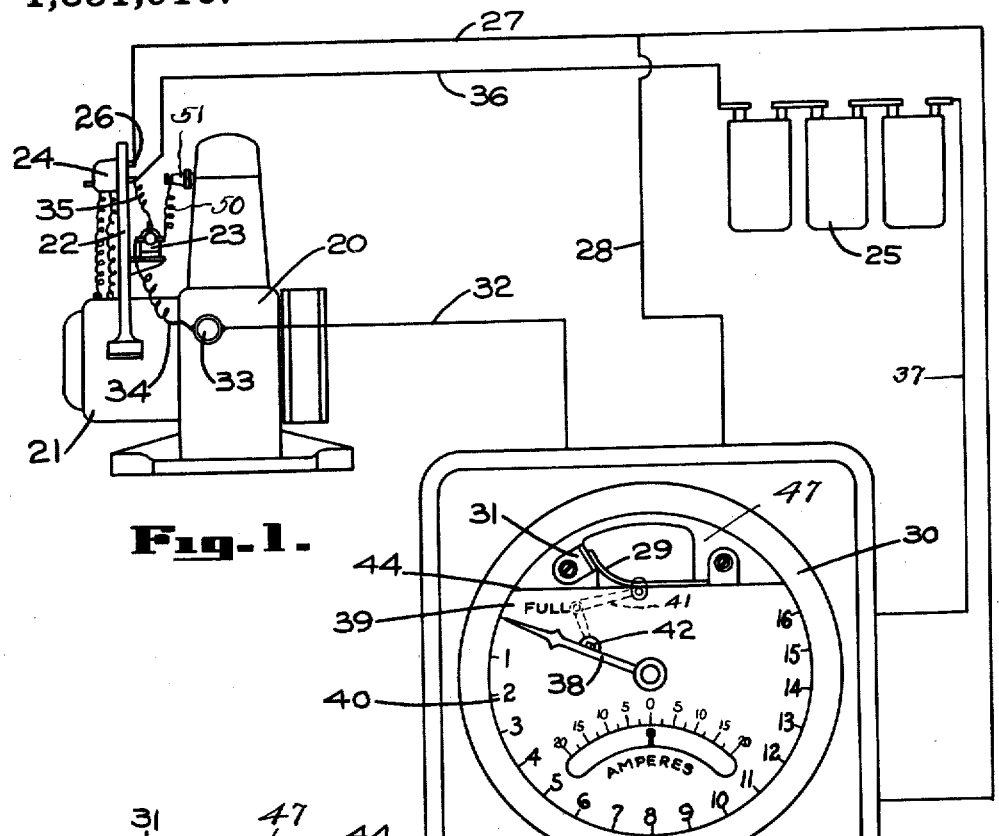
Figure 1 is a view partly diagrammatic and partly structural, and clearly sets forth the different elements of the system.

Referring to the drawing, and more particularly to the Fig. 1, the numeral 20 designates an internal combustion engine connected to the electric machine 21 in a manner clearly shown, described and claimed in the co-pending application of Charles F. Kettering and William A. Chryst, Serial No. 58,207, filed October 27, 1915.

A bracket 22 is secured to the electric machine 21, and is adapted to carry the ignition coil 23 and the controller switch 24.

This controller switch is described in the co-pending application of Charles F. Kettering and William A. Chryst, Serial No. 120,098, filed September 14, 1916, and is adapted, when operated by the attendant to close the circuit between the battery and the electric machine 21, whereby the electric machine will be operated to crank the engine 20.

As soon as the engine has become self-actuating, it will drive the electric machine 21 as a generator to charge the storage battery 25. The controller 24, as has been described in the above-mentioned application, will be automatically held in circuit making position.

When the engine is self-actuating, the primary ignition circuit therefor will be completed through the following circuit: From the electric machine 21 to the controller 24, to any suitable connection, thence from the contact 26 on the controller 24, through the wires 27 and 28, to the contact element 29 provided in the measuring device 30, thence through the contact 31, wire 32, to the circuit breaker 33, connection 34, primary winding of ignition coil 23, to the opposite side of the electric machine, via the connection 35. The wire 50 connects the secondary winding of coil 23 with the spark plug 51.

The charging circuit will flow from the terminal 26, of the controller 24, through wire 27, measuring device 30, thence through the wire 37 to the battery 25, and back to the opposite side of the generator 21, via the wire 36.

This circuit, which passes through the measuring device 30, will tend to operate the same to indicate the amount of current flowing into the storage battery 25. This amount of current is indicated by the hand or indicator element 38. The dial element 39 is provided on the measuring device 30, said dial having graduations 40 as shown on the drawing.

As shown and described in the co-pending application of Charles F. Kettering and William A. Chryst, Serial No. 58,207, filed October 27, 1915, this measuring device will not only be operated when the electric machine 21 is charging the battery 25, but will also be operated in a reverse direction when current is being used from the battery for any purpose.

Figure 2:
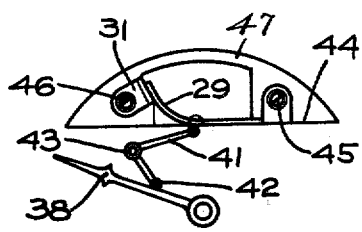
Fig. 2 is a detail view of the circuit making and breaking elements included on the electrical measuring device. These elements are shown closed in the present figure.
Figure 3:
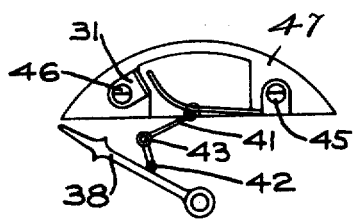
Fig. 3 shows the circuit making and breaking elements held in circuit breaking position.

When the engine is driving the generator to charge the battery 25, and said battery has become fully charged, the measuring device 30 is adapted to stop the operation of the engine by breaking the circuit. This is done by means of a bell-crank lever 41, interposed between the contact element 29 and the indicator hand 38 (see Figs. 2 and 3). This bell-crank lever 41 is provided with a projection 42, which is adapted to project through the dial 39 and into the path of the indicator hand 38.

Now, referring to Fig. 1, as soon as the indicator hand has reached the position shown, it will contact with the projection 42 of the bell-crank lever 41, and tend to push the same in the direction of rotation of the indicator. This pushing of the projection 42 will rotate the bell-crank lever about the point 43, said lever, after being moved a predetermined distance, will force the contact 29 out of engagement with the contact 31, and thereby break the ignition circuit of the engine, which has been closed through the engagement of these two contacts, thereby tending to stop the operation of the engine and consequently discontinuing the charging of the batteries 25 by the electric machine 21.

The making and breaking of the contact elements 29 and 31 will at times tend to cause a pitting or arcing at this point, which may, after a length of time, require the replacing of either one of these contact elements.

In order that these contact elements, if necessary to be replaced, may be easily removed and new ones positioned, a portion of the dial 39 has been cut away along the line 44 (see Fig. 1), to permit the positioning of the contact carrying insulating block 47 to be inserted in this opening.

This, as can be clearly seen, will make replacing of the contacts 29 and 31 easy, as all that is necessary is to remove the glass cover from the dial 39, and by removing the screws 45 and 46, which hold the contact elements 29 and 31 respectively in position, the new contact elements may be readily adjusted.

While the form of mechanism herein shown and described, constitutes a preferred form of embodiment of the invention it is to be understood that other forms might be adopted all coming within the scope of the claims which follow.

What I claim is as follows:

1. In a device of the character described, the combination with a meter including a dial and a hand; of mechanism mounted adjacent to said dial and having a part projecting into the path of travel of the hand; and a detachably mounted unit secured adjacent said dial and having contacts thereon arranged to be actuated by said mechanism, said unit being removable without disturbing said mechanism.

2. In a device of the character described, the combination with a meter; of switch actuating mechanism mounted thereon; and a detachably mounted unit secured adjacent said dial and having a pair of contacts thereon arranged to be actuated by said mechanism, said unit being removable without disturbing said contact operating mechanism.

3. In a device of the character described, the combination with a meter, including a dial of segmental shape; of a removable unit having a base of segmental shape and secured adjacent to said dial and having contacts thereon, said base and dial, when placed together, forming a circular face for the meter; a hand adapted to travel over said dial; and means mounted adjacent so as to project into the path of travel of the hand, and to actuate the contacts when engaged by the hand.

4. In a device of the character described, the combination with a meter, including operating mechanism and a dial of segmental shape; a hand actuated by said operating mechanism and adapted to travel over said dial; a unit having a base of segmental shape and including removable contact plates mounted adjacent to said dial, said base and dial, when placed together, forming a circular face for the meter; a lever mounted between the dial and operating mechanism and projecting into the path of travel of the hand, and adapted to actuate the contacts when engaged by said hand.

5. In a device of the character described, the combination with a meter, including operating mechanism and a dial of segmental shape; a hand actuated by said operating mechanism and adapted to travel over said dial; a removable unit having a base of segmental shape and including removable contact plates arranged with their contacting faces substantially perpendicular to the dial mounted adjacent to said dial, said base and dial, when placed together, forming a circular face for the meter; a lever mounted between the dial and operating mechanism and projecting into the path of travel of the hand, and adapted to actuate the contacts when engaged by said hand.

6. In a device of the character described, the combination with a meter, including a dial of segmental shape; of a removable unit having a base of segmental shape and secured adjacent to said dial and having contacts thereon, said base and dial when placed together, forming a circular face for the meter; and mechanism actuated by said meter for controlling said contacts.

In testimony whereof I affix my signature in the presence of two subscribing witnesses.

CHARLES F. KETTERING.

Witnesses:
WALTER N. RIEDEL,
J. W. McDONALD.